US010631050B2

(12) United States Patent
Fransen et al.

(10) Patent No.: US 10,631,050 B2
(45) Date of Patent: Apr. 21, 2020

(54) DETERMINING AND CORRELATING VISUAL CONTEXT ON A USER DEVICE WITH USER BEHAVIOR USING DIGITAL CONTENT ON THE USER DEVICE

(71) Applicant: Adobe Inc., San Jose, CA (US)

(72) Inventors: Peter Raymond Fransen, Soquel, CA (US); Aaron Motayne, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 15/810,503

(22) Filed: Nov. 13, 2017

(65) Prior Publication Data

US 2019/0149878 A1 May 16, 2019

(51) Int. Cl.
| | |
|---|---|
| H04N 21/24 | (2011.01) |
| H04N 21/258 | (2011.01) |
| H04N 21/25 | (2011.01) |
| H04N 21/442 | (2011.01) |
| H04N 21/45 | (2011.01) |
| H04N 21/466 | (2011.01) |
| G06T 7/90 | (2017.01) |
| G06K 9/00 | (2006.01) |
| H04N 21/658 | (2011.01) |
| G06K 9/46 | (2006.01) |

(52) U.S. Cl.
CPC ... *H04N 21/44222* (2013.01); *G06K 9/00469* (2013.01); *G06K 9/00711* (2013.01); *G06K 9/4652* (2013.01); *G06T 7/90* (2017.01); *H04N 21/4667* (2013.01); *H04N 21/6582* (2013.01)

(58) Field of Classification Search
None
See application file for complete search history.

(56) References Cited

U.S. PATENT DOCUMENTS

| | | | |
|---|---|---|---|
| 10,306,311 B1 * | 5/2019 | Knas | G06K 9/00302 |
| 2004/0010720 A1 * | 1/2004 | Singh | H04H 20/82 |
| | | | 709/224 |
| 2013/0057583 A1 * | 3/2013 | Gopalakrishnan | ........................... |
| | | | G06F 17/30967 |
| | | | 345/633 |
| 2013/0139193 A1 * | 5/2013 | Fan | H04N 7/157 |
| | | | 725/14 |

(Continued)

*Primary Examiner* — Brian T Pendleton
*Assistant Examiner* — Jean D Saint Cyr
(74) *Attorney, Agent, or Firm* — Kilpatrick Townsend & Stockton LLP

(57) ABSTRACT

Certain embodiments involve determining visual context associated with user behavior and associating the visual context with the user behavior. For example, a system captures a portion of a user interface provided to a user at a time of a user action on the user interface. The captured portion can include digital content and the system can detect the digital content. The system can also generate a digital representation of the digital content. The digital representation can indicate the digital and exclude the digital content. The system can determine a visual context associated with the user action based on the generated digital representation. The visual context describes the digital content displayed via the user interface at the time of the user action. The system can also determine subsequent digital content to output to the user to create a subsequent visual context to encourage a particular user behavior.

20 Claims, 9 Drawing Sheets

(56) References Cited

U.S. PATENT DOCUMENTS

2014/0195647 A1* 7/2014 Chen ................ H04L 67/10
709/219
2016/0323643 A1* 11/2016 Panchaksharaiah ...................
H04N 21/44016

* cited by examiner

300

If you can keep your head when all about you
　　Are losing theirs and blaming it on you,
If you can trust yourself when all men doubt you,
　　But make allowance for their doubting too;
If you can wait and not be tired by waiting,
　　Or being lied about, don't deal in lies,
Or being hated, don't give way to hating,
　　And yet don't look too good, nor talk too wise: —302

If you can dream-and not make dreams your master;
　　If you can think-and not make thoughts your aim;
If you can meet with Triumph and Disaster
　　And treat those two impostors just the same; —304

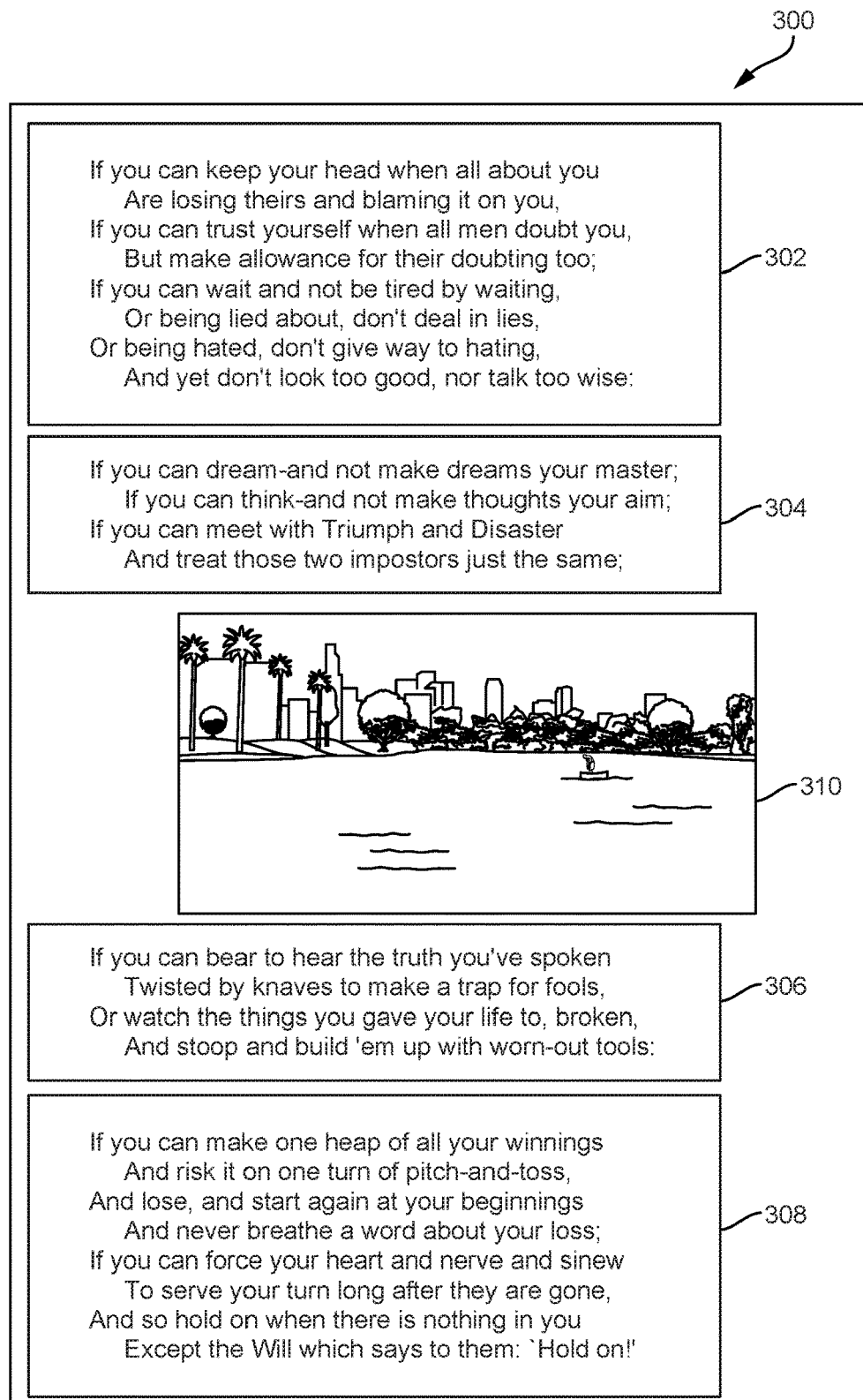
—310

If you can bear to hear the truth you've spoken
　　Twisted by knaves to make a trap for fools,
Or watch the things you gave your life to, broken,
　　And stoop and build 'em up with worn-out tools: —306

If you can make one heap of all your winnings
　　And risk it on one turn of pitch-and-toss,
And lose, and start again at your beginnings
　　And never breathe a word about your loss;
If you can force your heart and nerve and sinew
　　To serve your turn long after they are gone,
And so hold on when there is nothing in you
　　Except the Will which says to them: `Hold on!' —308

FIG. 3

DETERMINING AND CORRELATING VISUAL CONTEXT ON A USER DEVICE WITH USER BEHAVIOR USING DIGITAL CONTENT ON THE USER DEVICE

TECHNICAL FIELD

This disclosure generally relates to user devices and more specifically to determining visual context associated with user behavior and correlating the visual context with the user behavior based on digital content on the user device.

BACKGROUND

Many modern devices include a display device that can be used to provide digital content to a user of the device. The digital content can include text, images, sounds, videos, animations, etc. and the user can interact with the digital content. In some instances, the user can access or interact with the digital content and, as the user interacts with or accesses the digital content, the user may create a digital footprint that represents data about the user's digital activities or the user's digital behavior. In some instances, the data can be collected and analyzed for various purposes. For example, data that describes a context surrounding a user's digital behavior (e.g., a context surrounding a user's interaction with digital content or the user's decision to interact with digital content) can be useful for learning the user's digital behavior. As an example, temporal context surrounding the user's digital behavior (e.g., time or day that a user interacts with digital content) can be used to determine the user's digital behavior pattern such as, for example, a time of day that the user typically interacts with digital content.

The expansion of the types of digital content provided to users, along with the expansion of the types of data included in users' digital behavior data sets provides various challenges. For example, data about a user's digital behavior may include robust, complex data sets that include rich, granular, structured, or unstructured data describing the context surrounding the user's digital behavior. Conventional systems and methods may be unable to capture such robust data about the context surrounding the user's digital behavior and may only capture a limited subset of the data. For instance, conventional systems may be limited to capturing only temporal data surrounding the user's digital behavior such as, for example, a time that the user interacts with digital content or a frequency of the user's interactions. Systems and methods using such limited data can inaccurately learn user behavior. Further, conventional systems and methods for capturing and analyzing data describing the context surrounding the user's digital behavior may rely on explicit feedback from the user. However, explicit user feedback data can be sparse (e.g., incomplete) since users may not provide feedback about the context surrounding their digital behavior and systems and methods using such sparse data can inaccurately capture or analyze the context surrounding the user's digital behavior. Moreover, certain conventional systems and methods for capturing and analyzing data describing the context surrounding the user's digital behavior may unethically or illegally capture or collect a user's private information from the user device.

Thus, some existing systems and method for obtaining and analyzing data about a user's digital behavior or the context surrounding the user's digital behavior do not capture robust data about the user's digital behavior or capture private data about the user, which can make it challenging for conventional systems and method to accurately or ethically capture and analyze user digital behavior data or data about the context surrounding the user's digital behavior.

SUMMARY

Various embodiments of the present disclosure provide systems and methods for determining visual context associated with user behavior and associating the visual context with the user behavior based on digital content on the user device.

In one example, a method for determining visual context associated with user behavior and correlating the visual context with the user behavior includes capturing, by a processor and at a time of a user action on the user interface, a portion of a user interface provided to a user. The portion of the user interface includes digital content. The method further includes detecting, by the processor, the digital content included in the portion of the user interface. The method also includes generating, by the processor, a digital representation of the digital content. The digital representation indicates the digital content and the digital representation excludes the digital content. The method further includes determining, by the processor, a visual context associated with the user action based on the generated digital representation. The visual context describes the digital content displayed via the user interface at the time of the user action. The method also includes determining, by the processor, subsequent digital content to output to the user to create a subsequent visual context to encourage a particular user behavior.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

BRIEF DESCRIPTION OF THE DRAWINGS

FIG. 3 is an image depicting an example of a portion of a user device that can be captured for determining visual context associated with user behavior and correlating the visual context with the user behavior based on digital content on the user device in accordance with one or more embodiments.

DETAILED DESCRIPTION

Figure 1:
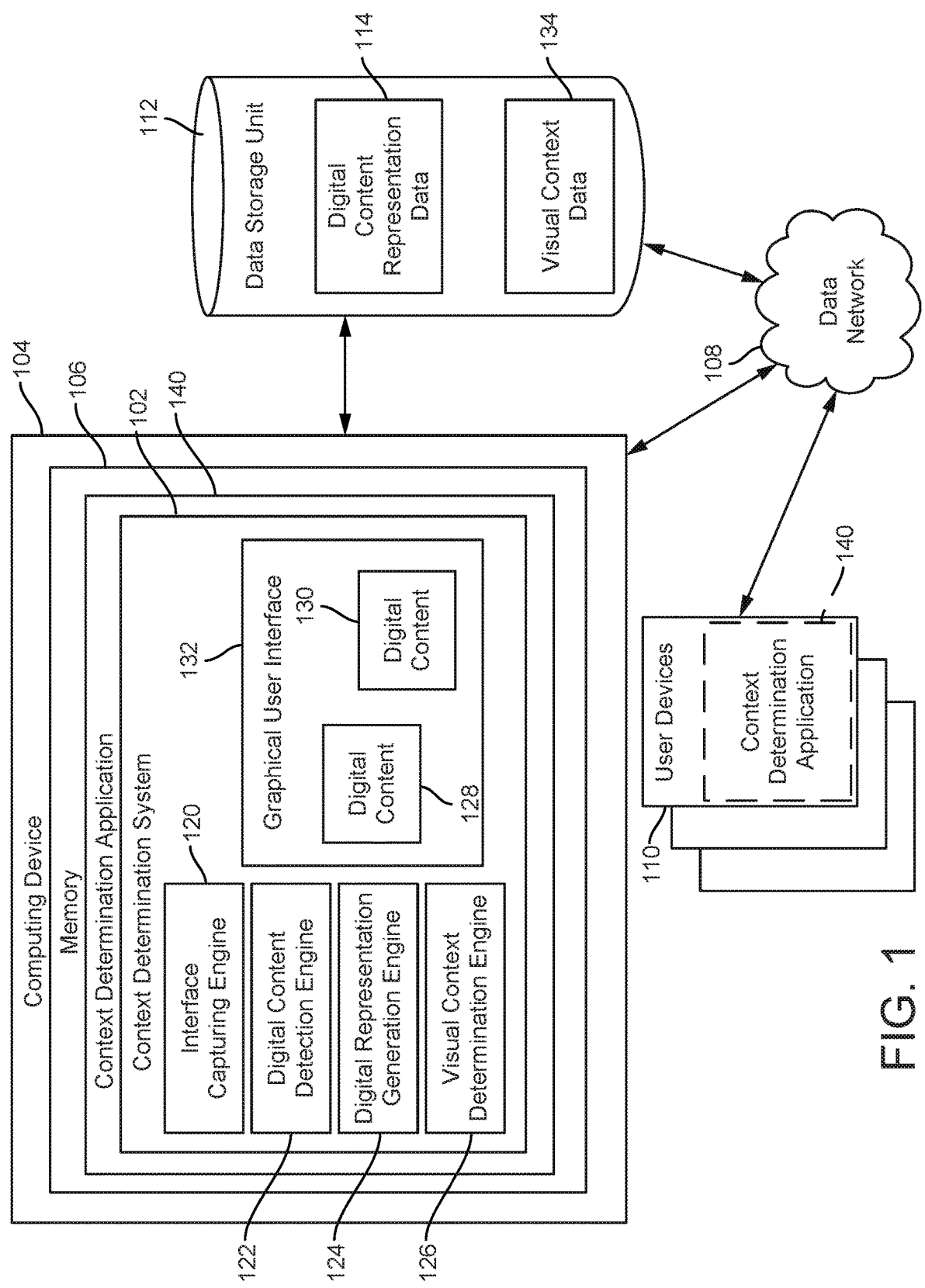
FIG. 1 is a block diagram of an exemplary environment in which a context determination system determines visual context associated with user behavior and correlates the visual context with the user behavior based on digital content on the user device in accordance with one or more embodiments.

Various aspects and features of the present disclosure relate to determining visual context associated with user behavior and correlating the visual context with the user behavior based on digital content on the user device. Visual context associated with user behavior can describe or indicate one or more digital content elements provided to a user via a user device at a time of a user action or a particular user behavior. For instance, visual context associated with user behavior can include an image or text displayed on the user device at the time the user provides user input to interact with the image, text, or one or more virtual icons displayed via the user device. For example, a visual context system captures a portion of an interface of a user device that includes various images, text, virtual icons, etc. displayed via the user device at the user interacts with the images, text, or virtual icons. The visual context system detects the images and texts included in the captured portion of the user interface and generates a representation of each image and a representation of each text. In this example, the generated representation of an image and the generated representation of text do not include the image or the text (e.g., do not include the actual image or the actual text). The visual context system can analyze the representations of the image and the text to determine a visual context surrounding the user action and correlate the visual context with the user action. For instance, the visual context system can determine an amount of text or a number of images displayed via the user device at the time the user provides user input to interact with the image, text, or one or more virtual icons. In this example, the visual context surrounding the user action is the amount of text or the number of images displayed via the user device at the time the user provides user input to interact with the image, text, or one or more virtual icons, which can be determined based on the representations of the text and/or images. The determined visual context can then be used to determine digital content to output to the user to create a subsequent visual context that will encourage a particular user behavior such as, for example, an amount of text or a number of images that should be included in the user interface to create a visual context that will likely cause the user to interact with the text and/or images. As another example, the visual context surrounding the user action can be used to determine an amount of text or a number of images that should be included in the user interface to create a visual context that will likely cause the user to provide user input to purchase an item displayed via the user interface device.

As described above, conventional systems and methods may be unable to capture the robust data about the context associated with a user's digital behavior and may only capture a limited subset of the data such as, for example, temporal data about the user's digital behavior. Moreover, conventional systems and methods for capturing and analyzing data describing the context surrounding the user's digital behavior may rely on explicit feedback from the user, which can be sparse (e.g., incomplete) since users may not provide feedback about the context surrounding their digital behavior and systems and methods using such sparse data can inaccurately capture or analyze the context surrounding the user's digital behavior. Furthermore, certain conventional systems and methods for capturing and analyzing data describing the context surrounding the user's digital behavior may unethically or illegally capture or collect a user's private information from the user device. Certain embodiments described herein address these issues by capturing visual context associated with user behavior and correlating the visual context with the user behavior based on digital content on the user device without collecting private information displayed via the user device.

The following non-limiting example is provided to introduce certain embodiments. A visual context determination system captures a portion of an interface of a user device provided to a user at a time of a user action and the portion of the interface includes digital content (e.g., text, images, virtual icons, etc.). For instance, the context determination system captures a portion of an interface of a mobile device that includes texts or images at a time the user interacts with the text, images, or virtual icon displayed via the interface (e.g., at the time the user provides touch input to interact with the text, images, or a virtual icon, provides touch input to purchase an item displayed via the mobile device, etc.). In this example, the context determination system analyzes the captured portion of the interface and detects (e.g., determines) the type of digital content included in the captured portion such as, for example, by identifying the text and the images included in the captured portion of the interface and detecting a position or location of the text and images. The context determination system generates a representation of the detected digital content that indicates a position or location of the digital content within captured portion of the interface and/or a type of the digital content. In this example, the generated representation of the digital content excludes the digital content (e.g., does not include the digital content). As an example, the context determination system generates a representation of digital content that is text included in the captured portion of the interface and the representation indicates that the digital content is text and a location of the text within the portion of the interface, but the representation does not include the actual text (e.g., does not include the letters or words of the text). The context determination system can generate representations of various digital content in the captured portion of the interface and analyze the various representations to determine visual context surrounding the user action and correlate the visual context with the user action based on the generated representations. For example, the context determination system analyzes the generated representations and determines an amount of text or a number of images displayed via the user device at the time of the user action and associates the amount of text or number of images with the user action. As another example, the context determination system analyzes the generated representations and determines a percentage of the captured portion of the interface that includes text or images at the time of the user action and associates the percentage with the user action.

In some embodiments, the determined visual context associated with user behavior or action can be used to determine various digital content to output to the user that will likely cause a particular user behavior. For example, the determined visual context can be used to determine digital content to output to the user to create a visual context that will encourage a particular user behavior. As an example, the determined visual context associated with the user behavior can be used to determine a percentage of the interface of the user device that should include text and/or images to create a visual context that will likely cause the user to interact with the text and/or images or encourage the user to take a particular action (e.g., encourage the user to provide user input to purchase an item displayed via the user interface device). In this manner, the context determination system can determine visual context associated with user behavior and correlate the visual context with the user behavior based on digital content on the user device.

As used herein, the term "digital content" is used to refer to any content that can be provided to a user of a user device. Examples of digital content included, but are not limited to, text, images, sounds, videos, animated graphics, animations, etc.

As used herein, the term "visual context" is used to refer to any digital content provided to a user of a user device at a time of a user action or a particular user behavior. For example, visual context can describe the digital content displayed via a user device at the time of the user action or user behavior.

As used herein, the term "user action" is used to refer to any user action, user behavior, or user interaction with respect to digital content provided to the user.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

FIG. 1 is a block diagram of an exemplary environment 100 in which a context determination system 102 determines visual context associated with user behavior and correlates the visual context with the user behavior based on digital content on the user device in accordance with one or more embodiments. The environment 100 includes the context determination system 102, one or more computing devices 104, one or more user devices 110, and one or more data storage units 112. The context determination system 102, the computing devices 104, the user devices 110, and the data storage unit 112 are communicatively coupled via one or more data networks 108 (e.g., the Internet, one or more local area networks ("LAN"), one or more wired area networks, or some combination thereof).

In some embodiments, a user of the computing device 104 visits a webpage or an application store to explore applications supported by the context determination system 102. The context determination system 102 provides the applications as a software as service ("SaaS"), or as a standalone application that may be installed on the computing device 104, or as a combination.

In some embodiments, the computing device 104 represents various types of devices. For example, the computing device 104 is a mobile device (e.g., a mobile telephone, a smartphone, a PDA, a tablet, a laptop, a camera, a tracker, a watch, a wearable device, etc.). The computing device 104, however, in some embodiments, is a non-mobile device (e.g., a desktop computer or another type of client device). In this example, the context determination system 102 is implemented on, executed by, or stored on one or more computing devices 104. For example, the context determination system 102 is stored on a memory device 106 of the computing device 104. In some embodiments, the context determination system 102 is executed on the one or more computing devices 104 via a context determination application 140.

In some embodiments, the computing device 104 executes the context determination system 102. The context determination system 102 includes an interface capturing engine 120, a digital content detection engine 122, a digital representation generation engine 124, and a visual context determination engine 126, which can each be executed on the computing device 104. For example, the engines 120, 122, 124, 126 each include one or more instructions stored on a computer-readable storage medium and executable by processors of the computing device 104. When executed by the one or more processors, the computer-executable instructions of the context determination system cause the context determination system to determine visual context associated with user behavior and correlate the visual context with the user behavior based on digital content on the computing device 104 or the user device 110.

For example, a user of the computing device 104 accesses digital content 128, 130 via the computing device 104. The digital content 128, 130 can include, or be a part of, a graphical user interface 132 displayed via a display device of the computing device 104. Digital content 128, 130 can each include, but is not limited to, text, images, sounds, videos, animated graphics, animations, documents, user interfaces, webpages, websites, virtual objects or icons, etc.

In some embodiments, the interface capturing engine 120 captures a portion of the graphical user interface 132 displayed via the display device of the computing device 104. For example, the context determination application 140 causes the interface capturing engine 120 to capture a portion of the graphical user interface 132 provided to a user of the computing device 104 at a time of a user action or user behavior and the portion of the graphical user interface includes digital content. In some examples, the user action or user behavior can include providing user input to interact with the graphical user interface 132 or digital content 128, 130.

The interface capturing engine 120 can be electrically or communicatively coupled to the digital content detection engine 122. The digital content detection engine 122 accesses data on the interface capturing engine 120. In another example, the digital content detection engine 122 receives or obtains data from the interface capturing engine 120. In some embodiments, the digital content detection engine 122 detects (e.g., identifies) a type of digital content 128, 130 included in the captured portion of the graphical user interface 132 based on the data accessed, obtained, or received from the interface capturing engine 120.

For example, the digital content detection engine 122 receives or obtains data indicating the portion of the graphical user interface 132 captured by the interface capturing engine 120. The digital content detection engine can analyze the captured portion of the graphical user interface 132 to detect (e.g., identify) a type of digital content 128, 130 included in the captured portion of the graphical user interface 132 and/or properties of the digital content 128, 130. For example, the context determination application 140 causes the digital content detection engine 122 to analyze the captured portion of the graphical user interface 132 and identify text, images, etc. included in the captured portion of the graphical user interface 132. In some embodiments, the context determination application 140 causes the digital content detection engine 122 to analyze the captured portion of the graphical user interface 132 to determine a position or location of the digital content 128, 130 within the graphical user interface. In some embodiments, the context determination application 140 causes the digital content detection engine 122 to analyze the captured portion of the graphical user interface to determine a type of the digital content within the graphical user interface.

In some embodiments, the digital content detection engine 122 can be electrically or communicatively coupled to the digital representation generation engine 124. The digital representation generation engine 124 accesses data on the digital content detection engine 122. In another example, the digital representation generation engine 124 receives or obtains data from the digital content detection engine 122. In some embodiments, digital representation generation engine 124 generates a digital representation of detected digital content 128, 130 included in the captured portion of the graphical user interface 132 based on the data accessed, obtained, or received from the digital content detection engine 122.

For example, the digital representation generation engine 124 receives or obtains data indicating the digital content 128, 130 detected by the digital content detection engine 122. The context determination application 140 causes the digital representation generation engine 124 to generate a digital representation of the detected digital content 128, 130 that indicates a position or type of the digital content 128, 130 in the captured portion of the graphical user interface 132. In some examples, the generated digital representation of the digital content 128, 130 excludes the detected digital content 128, 130 (e.g., does not include the detected digital content 128, 130). For example, a digital representation of a detected image in the captured portion of the graphical user interface 132 does not include the actual image. As an example, a digital representation of the image in the capture portion of the graphical user interface 132 can be an outline of an amount of space occupied by the image. In this example, the digital representation indicates that an image is within the outline, but the digital representation does not include or depict the actual image within the outline. The digital representation generation engine 124 can generate various digital representations of digital content in the captured portion of the graphical user interface 132 in substantially the same manner as described above.

In some embodiments, the digital representation generation engine 124 can be electrically or communicatively coupled to the visual context determination engine 126. The visual context determination engine 126 accesses data on the digital representation generation engine 124. In another example, the visual context determination engine 126 receives or obtains data from the digital representation generation engine 124. In some embodiments, the visual context determination engine 126 determines a visual context associated with user behavior based on the data accessed, obtained, or received from the digital representation generation engine 124.

For example, the visual context determination engine 126 obtains data indicating various digital representations generated by the digital representation generation engine 124 (e.g., data indicating a position and/or amount of various outlines of text and/or images). The context determination application 140 causes the visual context determination engine 126 to analyze the digital representations to determine visual context associated with user behavior and correlate the visual context with the user behavior based on digital content on the computing device 104 or the user device 110. For example, the visual context determination engine 126 analyzes the generated digital representations and determines a number or position of images included in the captured portion of the graphical user interface 132 at the time of the user action (e.g., at the time the user provides touch input to interact with the digital content) and associates the number or position of the images with the user action. In this example, the visual context is the number or position of the images included in the captured portion of the graphical user interface 132 at the time of the user action and the visual context determination engine 126 associates the visual context with the user action.

In some embodiments, the determined visual context associated with user behavior or action can be used to determine various digital content to output to the user that will likely cause a particular user behavior. For example, the determined visual context can be used to determine digital content to output to the user to create a visual context that will encourage a particular user behavior. As an example, the determined visual context associated with the user behavior can be used to determine a number or position of images that should be included in the graphical user interface of the computing device 104 to create a visual context that will likely cause the user to interact with text and/or images included in the graphical user interface or encourage the user to take a particular action (e.g., encourage the user to provide user input to purchase an item displayed via the user interface device).

In some examples, the data storage unit 112 can store data, such as, data that has been processed by the context determination system 102. As an example, the data storage unit 112 stores one or more digital representations generated by digital representation generation engine 124 as digital content representation data 114. As another example, the data storage unit 112 stores one or more visual contexts determined by the visual context determination engine 126 as visual context data 134.

In the example depicted in FIG. 1, a user can interface with the one or more user devices 110 to access the context determination system 102. In some embodiments, each of the user devices 110 represents various types of devices. For example, the user device 110 is a mobile device (e.g., a mobile telephone, a smartphone, a PDA, a tablet, a laptop, a camera, a tracker, a watch, a wearable device, etc.). The user device 110, however, in some embodiments, is a non-mobile device (e.g., a desktop computer or another type of client device). In some embodiments, the context determination system 102 is executed on the one or more user devices 110 via a context determination application 140. In this example, the user device 110 includes one or more components of the context determination system 102.

Although the exemplary environment 100 of FIG. 1 is depicted as having a certain number of components, in other embodiments, the exemplary environment 100 has any number of additional or alternative components. Further, while FIG. 1 illustrates a particular arrangement of the computing device 104, the context determination system 102, user devices 110, and the data storage unit 112, various additional arrangements are possible. As an example, while FIG. 1 illustrates data storage unit 112 and the context determination system 102 as part of separate systems, in some embodiments, the data storage unit 112 and the context determination system 102 are part of a single system.

Figure 2:
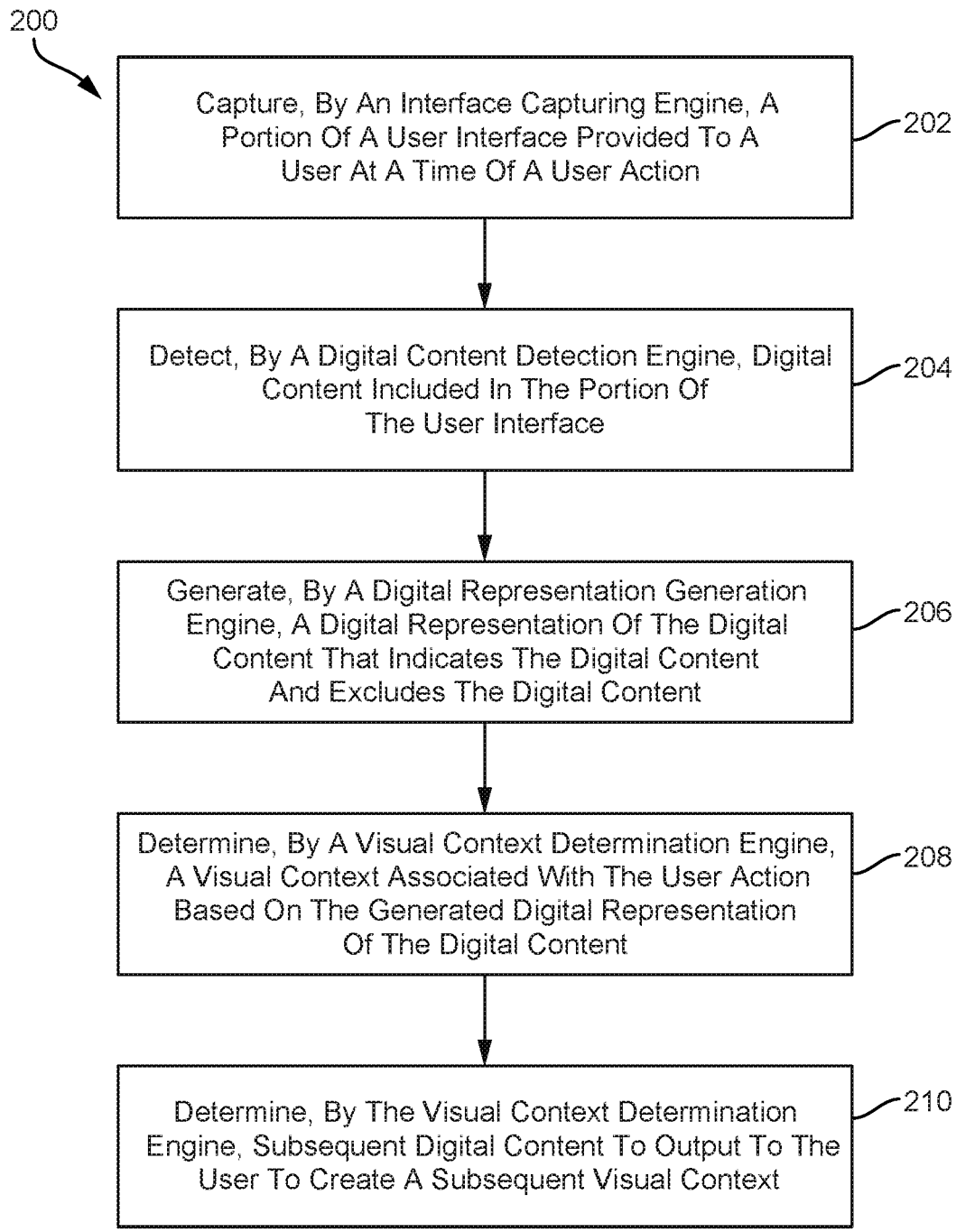
FIG. 2 is a flow chart depicting an example of a process for determining visual context associated with user behavior and correlating the visual context with the user behavior based on digital content on the user device in accordance with one or more embodiments.

FIG. 2 is a flow chart depicting an example of a process for determining visual context associated with user behavior and correlating the visual context with the user behavior based on digital content on the user device in accordance with one or more embodiments. In some embodiments, one or more processing devices such as, for example, the computing system described herein with respect to FIG. 5, implement operations depicted in FIG. 2 by executing suitable program code (e.g., the context determination system 102 of FIG. 1) that implements one or more algorithms encompassed by the process 200. For illustrative purposes, the process 200 is described with reference to the examples depicted in FIG. 1, but other implementations are possible.

In block 202, a portion of a graphical user interface 132 provided to a user is captured at a time of a user action. In some embodiments, one or more processing devices execute an interface capturing engine 120 to capture the portion of the graphical user interface 132 at the time of the user action. In some embodiments, the computing device 104 executes the context determination system 102. The context determination system 102 includes the interface capturing engine 120, which can each be executed on the computing device 104. For example, the interface capturing engine 120 includes one or more instructions stored on a computer-readable storage medium and executable by processors of the computing device 104. When executed by the one or more processors, the computer-executable instructions cause the interface capturing engine 120 to capture the portion of the graphical user interface 132 at the time of the user action.

For example, a user of a computing device 104 interacts with (e.g., accesses) digital content (e.g., digital content 128, 130 of FIG. 1) via the computing device 104 or otherwise interacts with the graphical user interface 132. The digital content can include, or be a part of, a graphical user interface 132 displayed via a display device of the computing device 104. Examples of digital content include, but are not limited to, text, images, sounds, videos, animated graphics, animations, documents, user interfaces, webpages, websites, virtual objects or icons, etc. In this example, the interface capturing engine 120 captures a portion of a graphical user interface 132 displayed to the user when the user interacts with text, images, or virtual icons displayed in the graphical user interface 132 such as, for example, when the user provides user input to interact with the virtual icons, provides user input to purchase an item displayed in the graphical user interface 132, or provides any other user input. In this example, the captured portion can the include text, images, items, or virtual icons.

For example, FIG. 3 is an image depicting an example of a portion 300 of a user device that can be captured for determining visual context associated with user behavior and correlating the visual context with the user behavior based on digital content on the user device in accordance with one or more embodiments. In the example depicted in FIG. 3, the portion 300 can be a portion of a graphical user interface 132 displayed to a user via a display device of the computing device 104. The portion 300 can be captured in response to the user interacting with one or more of digital content elements 302, 304, 306, 308, 310. In this example, the captured portion 300 of the graphical user interface includes digital content or digital content elements 302, 304, 306, 308, 310. In the example depicted in FIG. 3, digital content 302, 304, 306, 308 each include text and digital content 310 includes an image.

Returning to FIG. 2, in block 204, the digital content included in the portion of the graphical user interface 132 is detected. In some examples, the context determination application 140 causes a digital content detection engine 122 to detect a type of digital content included in the captured portion of the graphical user interface 132 and/or properties of the digital content. For example, the digital content detection engine 122 analyzes the captured portion of the graphical user interface 132 and determines a location or position of the digital content and/or a type of the digital content. As an example, and with reference to FIG. 3, the digital content detection engine 122 determines a location of text and images in the captured portion of the graphical user interface (e.g., the digital content 302, 304, 306, 308, 310) and determines that the digital content includes text or an image. In some examples, the digital content detection engine 122 can analyze the captured portion of the graphical user interface to detect a type and/or properties of digital content included in the captured portion using various methods and techniques such as, for example, Optical Character Recognition ("OCR") techniques, image recognition techniques, or any other suitable method or technique.

In block 206, a digital representation of the digital content is generated. In some embodiments, one or more processing devices execute a digital representation generation engine 124 to generate a digital representation of the digital content. In some embodiments, the computing device 104 executes the context determination system 102. The context determination system 102 includes the digital representation generation engine 124, which can each be executed on the computing device 104. For example, the digital representation generation engine 124 includes one or more instructions stored on a computer-readable storage medium and executable by processors of the computing device 104. When executed by the one or more processors, the computer-executable instructions cause the digital representation generation engine 124 to generate a digital representation of the digital content.

Figure 4:
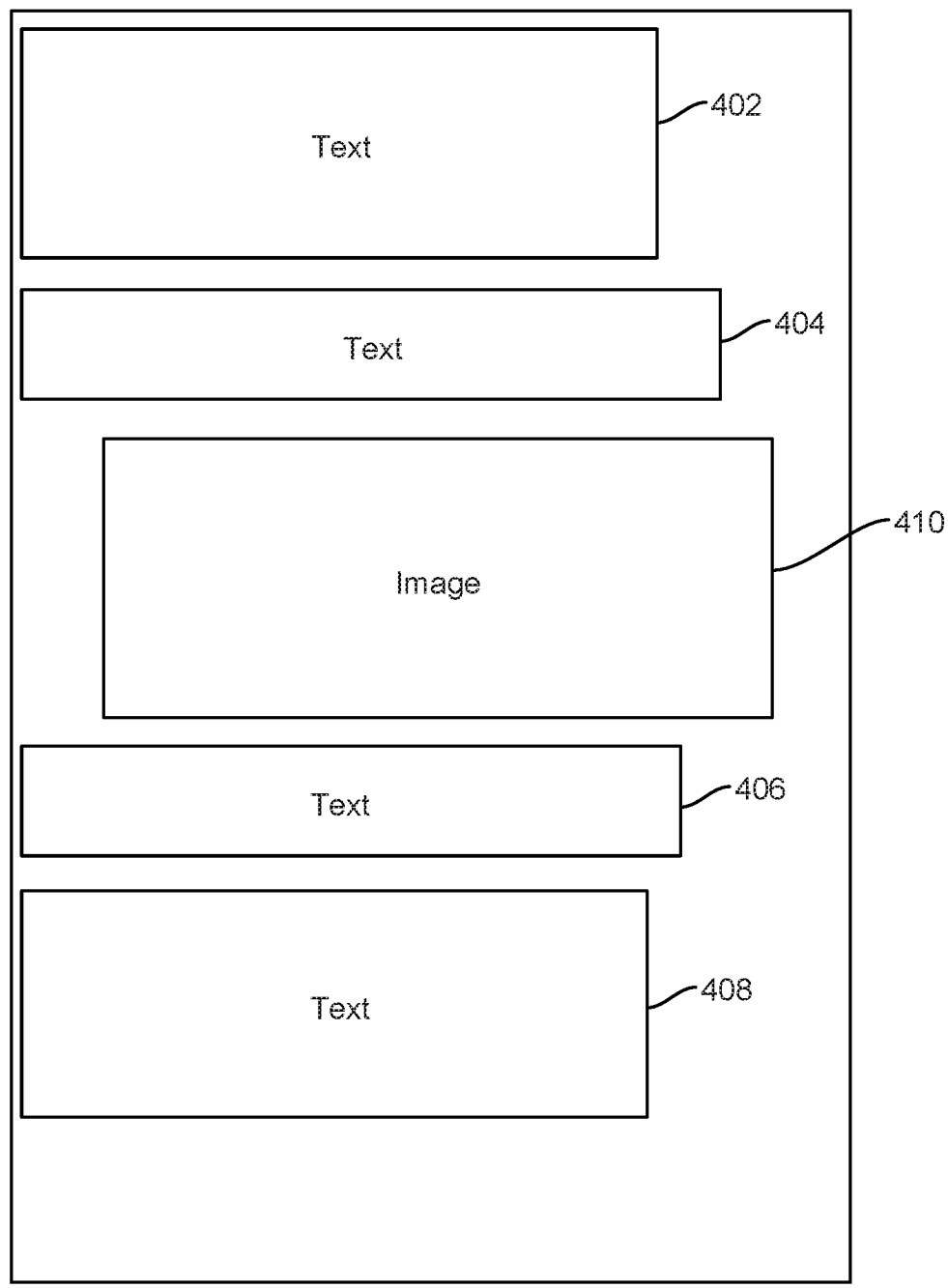
FIG. 4 is an image depicting an example of various representations of digital content on a user device that can be used for determining visual context associated with user behavior and correlating the visual context with the user behavior based on digital content on the user device in accordance with one or more embodiments.

In some examples, a digital representation of digital content indicates a position or location of the digital content within the captured portion of the graphical user interface 132 and/or a type of the digital content, but the digital representation of the digital content excludes the digital content (e.g., does not include the digital content). As an example, a digital representation of text in the capture portion of the graphical user interface 132 can be an outline of an amount of space occupied by the text. In this example, the digital representation indicates that text is within the outline, but the digital representation does not include or depict the actual text within the outline. For example, FIG. 4 is an image depicting an example of various representations 402, 404, 406, 408, 410 of digital content on a user device that can be used for determining visual context associated with user behavior and correlating the visual context with the user behavior. In this example, each representation 402, 404, 406, 408, 410 is a digital representation of digital content (e.g., a digital representation of the digital content 302, 304, 306, 308, 310 of FIG. 3) that can be generated by the digital representation generation engine 124. In the example depicted in FIG. 4, each representation 402, 404, 406, 408, 410 can be generated by the digital representation generation engine 124 and each representation 402, 404, 406, 408, 410 indicates a position of a corresponding digital content and a type of the digital content, but excludes the actual digital content. For instance, the representation 402 indicates a position of digital content that includes text within the captured portion of the graphical user interface 132 (e.g., the digital content 302 of FIG. 3 that includes text) and that the digital content includes text, but the representation 402 does not include the actual text (e.g., does not include the letters or words of the text). As another example, the representation 410 indicates a position of digital content that includes an image (e.g., the digital content 310 of FIG. 3) within the captured portion of the graphical user interface 132 and that the digital content is an image, but the representation 410 does not include the actual image.

Returning to FIG. 2, in block 208, a visual context associated with the user action is determined based on the generated digital presentation of the digital content. In some embodiments, one or more processing devices execute a visual context determination engine 126 to determine a visual context associated with the user action based on the generated digital representation of the digital content. In some embodiments, the computing device 104 executes the context determination system 102. The context determination system 102 includes the visual context determination engine 126, which can each be executed on the computing device 104. For example, the visual context determination engine 126 includes one or more instructions stored on a computer-readable storage medium and executable by processors of the computing device 104. When executed by the one or more processors, the computer-executable instructions cause the visual context determination engine 126 to determine a visual context associated with the user action based on the generated digital representation of the digital content.

For example, the digital representation generation engine 124 generates various digital representations of digital content in the captured portion of the graphical user interface (e.g., in block 206) and the visual context determination engine 126 obtains or accesses data indicating the various digital representations. The visual context determination engine 126 analyzes the various digital representations to determine visual context surrounding the user action. In this example, the visual context determination engine 126 can correlate the visual context with the user action. In some examples, the computer-executable instructions cause the visual context determination engine 126 to perform one or more operations to determine a visual context associated with the user action based on the generated digital representation of the digital content. As an example, and with reference to FIG. 4, the visual context surrounding the user action can include the various digital representations of the digital content of FIG. 3 that describe or indicate the digital content, but exclude the actual digital content.

Figure 6:
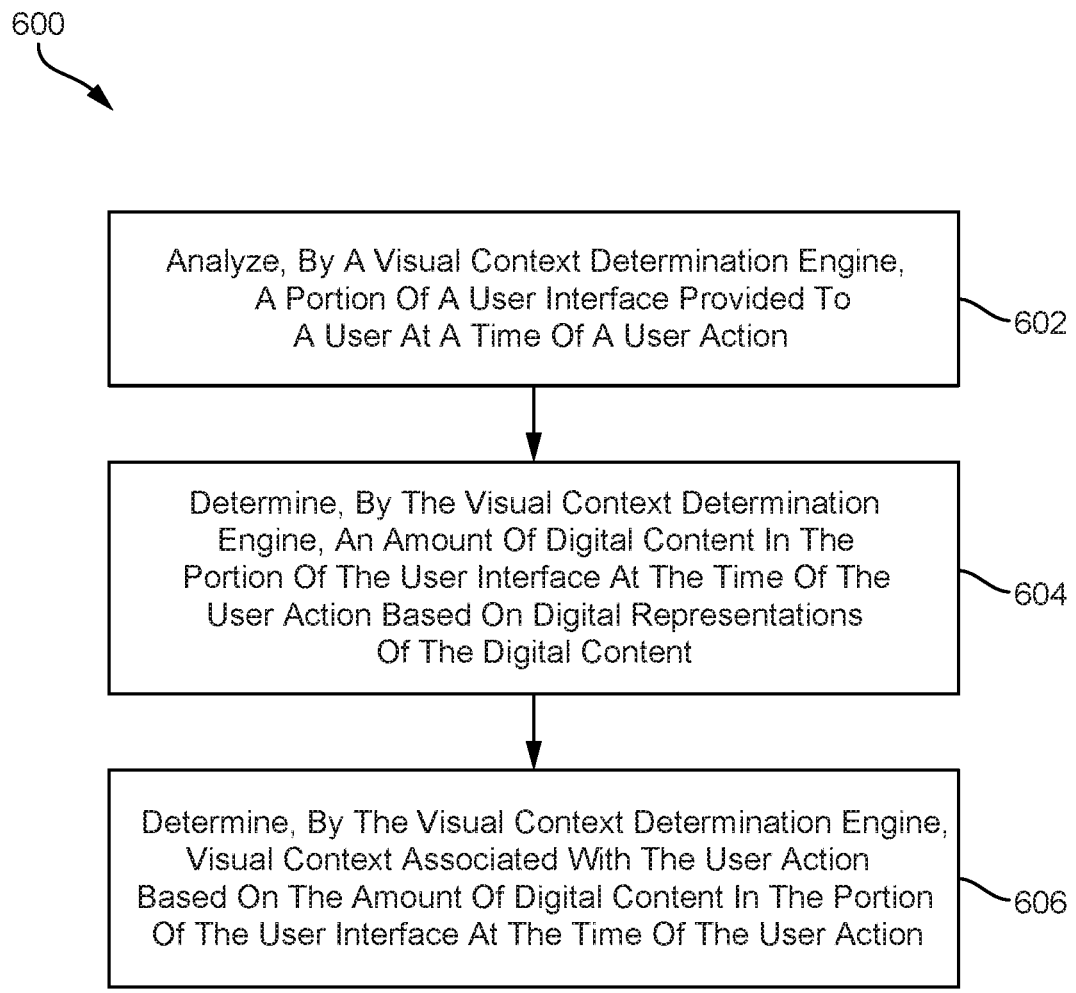
FIG. 6 is a flow chart depicting an example of a process for determining a visual context associated with user action based on a generated digital representation of digital content in accordance with one or more embodiments.

For example, FIG. 6 is a flow chart depicting an example of a process 600 for determining a visual context associated with the user action based on the generated digital representation of the digital content in accordance with one or more embodiments.

In block 602, the visual context determination engine 126 analyzes the captured portion of the graphical user interface 132 (e.g., the portion of the graphical user interface captured in block 202 of FIG. 2).

In block 604, the visual context determination engine 126 determines an amount of digital content such as, for example, an amount text or a number of images, displayed via the graphical user interface at the time of the user action based on the digital representations of the digital content (e.g., the digital representations generated in block 206 of FIG. 2).

In block 606, the visual context determination engine 126 determine a visual context associated with the user action based on the amount of digital content in the captured portion of the graphical user interface 132 at the time of the user action and associates the visual context with the user action. In this example, the visual context is the amount of text or the number of images displayed via the graphical user interface 132 at the time of the user action and the visual context determination engine 126 associates the visual context with the user action.

In some examples, in block 606, the visual context determination engine 126 analyzes the generated digital representations or the captured portion of the graphical user interface 132 and determines which of the individual digital content elements represents a largest percentage of the captured portion of the graphical user interface 132 (e.g., which of the individual representations 402, 404, 406, 408, 410 occupies the largest percentage of the captured portion of the graphical user interface). For example, the visual context determination engine 126 analyzes the captured portion of the graphical user interface 132 and determines a first size (e.g., area) of a first digital representation (e.g., the digital representation 402) and a second size of a second digital representation (e.g., the digital representation 404). In this example, the visual context determination engine 126 can determine a total size of the captured portion of the graphical user interface (e.g., a total size of the portion 300 of FIG. 3). Continuing with this example, the visual context determination engine 126 can compare the first size of the first digital representation and the total size of the captured portion of the graphical user interface 132 to determine a first relative size of the digital representation (e.g., a size of the first digital representation relative to the total size of the captured portion of the graphical user interface). The visual context determination engine 126 can also compare the second size of the second digital representation and the total size of the captured portion of the graphical user interface 132 to determine a second relative size of the second digital representation. In this example, the visual context determination engine 126 can determine which of the first or second digital representations represents a larger percentage of the captured portion of the graphical user interface 132 by comparing the first and second relative sizes. In this example, the visual context indicates which of the individual digital content elements represents a largest percentage of the captured portion of the graphical user interface 132 and the visual context determination engine 126 can associate the visual context with the user action.

In another example, the visual context determination engine 126 analyzes the generated digital representations and determines a ratio between various types of digital representations in the captured portion of the graphical user interface 132 such as, for example, by determining a ratio of text to images included in the captured portion of the graphical user interface 132. In some examples, the visual context determination engine 126 analyzes the generated digital representations and determines a ratio between digital content in the captured portion of the graphical user interface 132 and empty space or white space in the portion of the graphical user interface (e.g., a ratio between the amount of space occupied by text and images and the amount of empty space in the interface). For example, the visual context determination engine 126 detects digital content elements within the captured portion of the graphical user interface 132 (e.g., in block 204) and detects a portion of the captured interface that does not include digital content (e.g., by determining an amount of empty space or white space in the captured interface). In this example, the visual context determination engine 126 can determine a ratio between the amount of space in the captured interface that is occupied by digital content elements (e.g., texts or images) and the amount of empty space on the captured portion of the graphical user interface 132 using various methods and techniques, such as for example, by comparing a size of the digital content elements and the size of the empty space.

Figure 7:
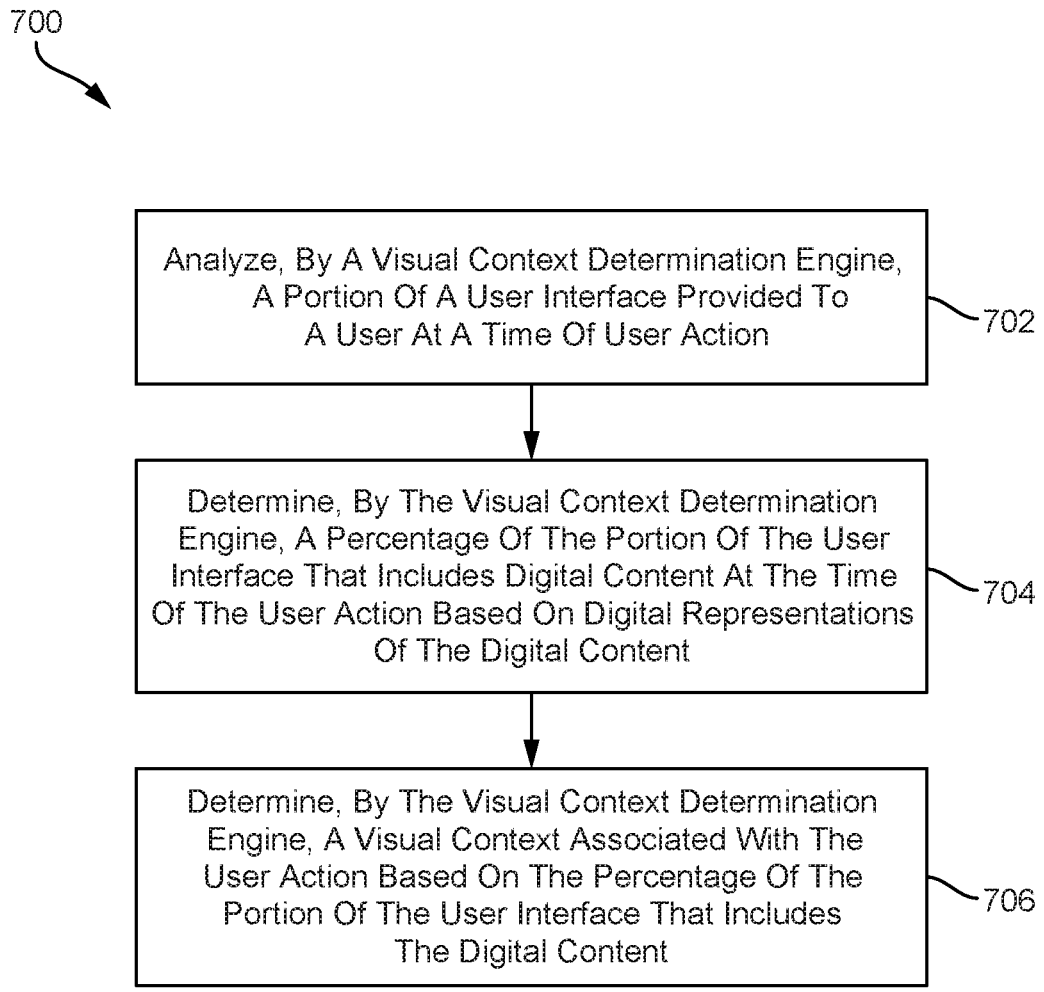
FIG. 7 is a flow chart depicting another example of a process for determining a visual context associated with user action based on a generated digital representation of digital content in accordance with one or more embodiments.

FIG. 7 is a flow chart depicting another example of a process 700 for determining a visual context associated with the user action based on the generated digital representation of the digital content in accordance with one or more embodiments.

In block 702, the visual context determination engine 126 analyzes the captured portion of the graphical user interface 132 (e.g., the portion of the graphical user interface captured in block 202 of FIG. 2).

In block 704, the visual context determination engine 126 determines a percentage of the captured portion of the graphical user interface 132 that includes digital content at the time of the user action based on the digital representations of the digital content (e.g., the digital representations generated in block 206 of FIG. 2). For instance, the visual context determination engine 126 determines a total area (e.g., size) of the captured portion of the graphical user interface 132 and an area of a digital representation included in the captured portion of the graphical user interface 132. In this example, the context determination system 102 compares the areas to determine a percentage of the total area of the captured portion of the graphical user interface 132 that includes digital content.

In block 706, the visual context determination engine 126 determine a visual context associated with the user action based on the percentage of the captured portion of the graphical user interface 132 that includes digital content at the time of the user action. In this example, the visual context is the percentage of the captured portion of the graphical user interface 132 that includes digital content at the time of the user action and the visual context determination engine 126 associates the visual context with the user action.

Figure 8:
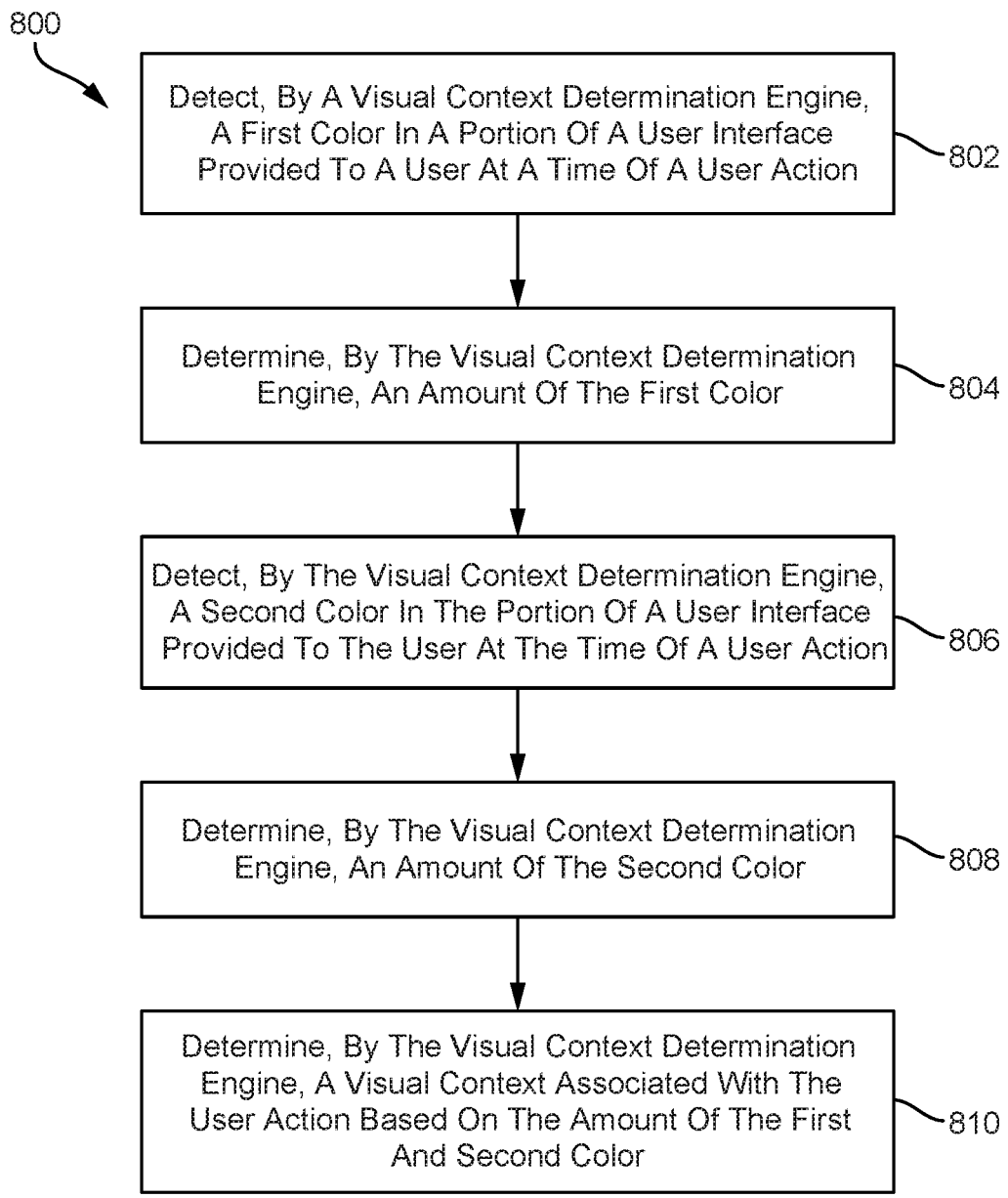
FIG. 8 is a flow chart depicting another example of a process for determining a visual context associated with user action based on a generated digital representation of digital content in accordance with one or more embodiments.

FIG. 8 is a flow chart depicting another example of a process 800 for determining a visual context associated with the user action based on the generated digital representation of the digital content in accordance with one or more embodiments.

In block 802, the visual context determination engine 126 detects a first color in the captured portion of the graphical user interface 132. For example, the visual context determination engine 126 analyzes the captured portion of the graphical user interface 132 (e.g., the portion of the graphical user interface captured in block 202 of FIG. 2) and detects the first color.

In block 804, the visual context determination engine 126 determines an amount of the first color in the captured portion of the graphical user interface 132.

In block 806, the visual context determination engine 126 detects a second color in the captured portion of the graphical user interface 132.

In block 808, the visual context determination engine 126 determines an amount of the second color in the captured portion of the graphical user interface 132.

In block 810, the visual context determination engine 126 determine a visual context associated with the user action based on the amount of the first color and the amount of the second color. In this example, the visual context is the amount of the first and second color in the graphical user interface 132 at the time of the user action and the visual context determination engine 126 associates the visual context with the user action.

In some examples, in block 810, determining visual context surrounding the user action includes analyzing the captured portion of the graphical user interface 132 to determine color information associated with the visual context. For example, the visual context determination engine 126 analyzes the captured portion of the graphical user interface 132 and detects (e.g., identifies) one or more colors in the captured portion of the graphical user interface 132 (e.g., a color in digital content included in the graphical user interface). In this example, the visual context determination engine 126 can determine one or more colors that appear most frequently in the captured portion of the graphical user interface 132. For example, the visual context determination engine 126 detects a first and second color in the captured portion of the graphical user interface 132. In this example, the visual context determination engine 126 determines a first amount of the first color and a second amount of the second color (e.g., an amount of times the color is detected within the graphical user interface). The visual context determination engine 126 compares the first and second amount to determine whether the first or second color occurs more frequently in the captured portion of the graphical user interface 132.

In some examples, the visual context determination engine 126 detects colors in the captured portion of the graphical user interface 132 and groups each detected color into various color groups. In this example, the visual context determination engine 126 can identify a color group that appears most frequently in the captured portion of the graphical user interface 132 based on the color group. For example, the visual context determination engine 126 detects a first color and a second color in the captured portion of the graphical user interface 132. The visual context determination engine 126 forms one or more groups of colors based on a characteristic of the first and second color. For instance, the visual context determination engine 126 groups the first and second color into a color group such as, a red color group, green color group, blue color group, etc. by using, for example, Red, Green, Blue (RGB) color rounding models, algorithms, or techniques to determine a similarity between the detected color and the color red, blue, or green. In this example, the visual context determination engine 126 detects various colors in the captured portion of the graphical user interface 132, groups the colors into various color groups, and determines which color group appears most frequently in the captured portion of the graphical user interface. In some examples, the visual context determination engine 126 detects colors in the captured portion of the graphical user interface 132 and determines an average color of the captured portion of the graphical user interface 132 such as, for example, by recursively scaling down an image of the captured portion of the graphical user interface 132 until a pixel remains that represents the average color. In other examples, the visual context determination engine 126 determines an average color of the captured portion of the graphical user interface using any suitable method or technique.

In some examples, the visual context determination engine 126 detects various colors in the captured portion of the graphical user interface 132 and constructs one or more color histograms that represent a distribution of detected colors or color groups in the captured portion.

Returning to FIG. 2, in block 210, the context determination system 102 can determine subsequent digital content to output to the user to create a subsequent visual context. For example, the visual context determination engine 126 of the context determination system 102 can use the determined visual context associated with user behavior or action to determine various digital content to output to the user that will likely cause a particular user behavior.

Figure 9:
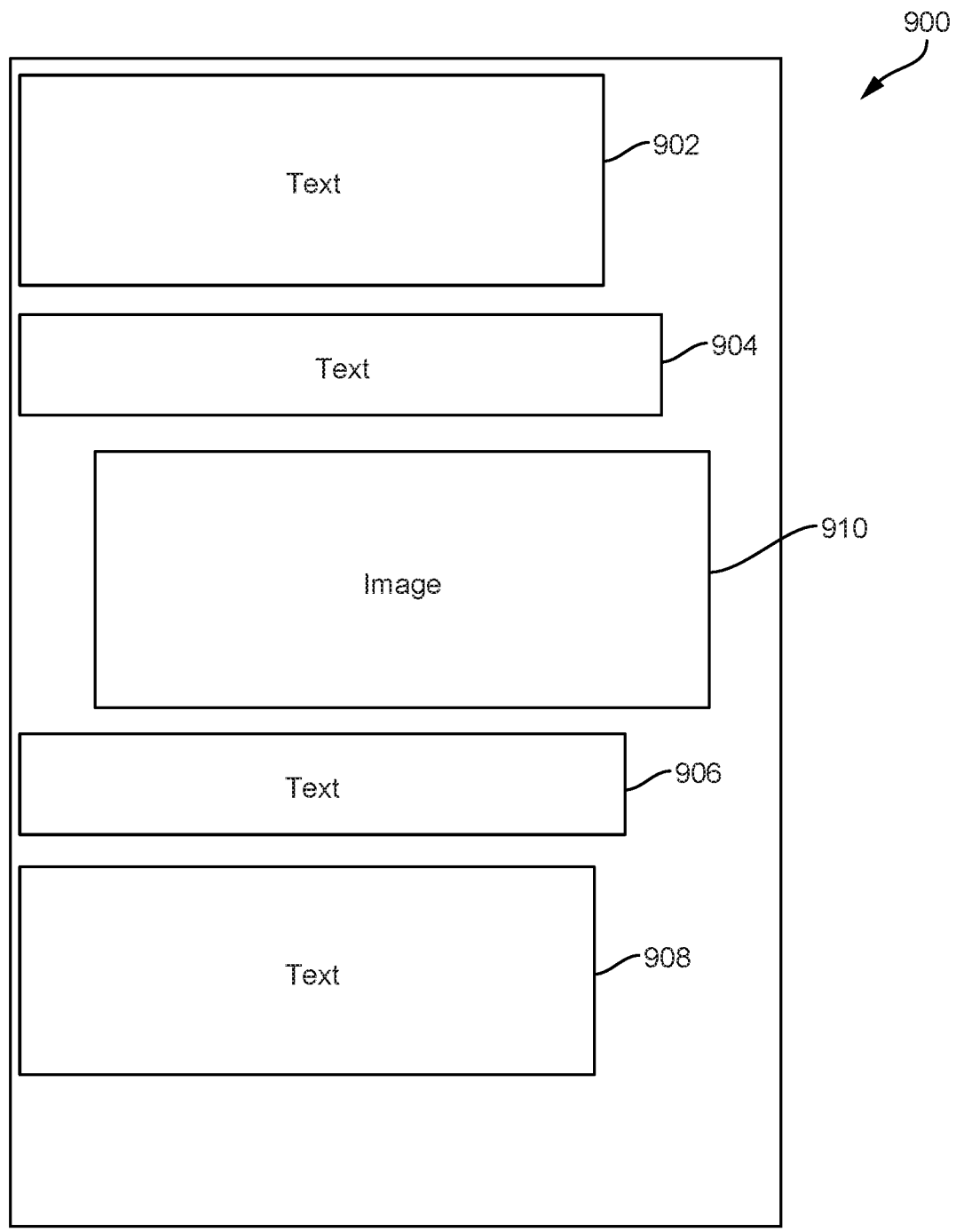
FIG. 9 is an example of a graphical user interface that can be provided to a user based on a determined visual context in accordance with one or more embodiments.

For example, the determined visual context can be used to determine digital content to output to the user to create a visual context that will encourage a particular user behavior. As an example, the determined visual context associated with the user behavior can be used to determine a percentage of the interface of the user device that should include text and/or images to create a visual context that will likely cause the user to interact with the text and/or images or encourage the user to take a particular action (e.g., encourage the user to provide user input to purchase an item displayed via the user interface device). For example, FIG. 9 is an example of a graphical user interface 900 that can be provided to a user based on a determined visual context. In the example depicted in FIG. 9, the graphical user interface includes an amount and/or types of digital content 902, 904, 906, 908, 910 that are similar to the amount and/or types of digital content included in the portion 300 of a graphical user interface of FIG. 3. For example, the graphical user interface 900 can include digital content 902, 904, 906, 908 that can each include text and digital content 310 that includes an image.

In this manner, the context determination system 102 can determine visual context associated with user behavior and correlate the visual context with the user based on digital content on the user device. In some embodiments described above, the context determination system 102 determines visual context associated with user behavior based on generated digital representations that exclude the actual digital content (e.g., do not include the actual digital content displayed via the user device), which can allow the context determination system 102 to determine visual context without collecting private information displayed via the computing device 104.

In some embodiments, the context determination system 102 can use the determined visual context associated with user behavior or action (e.g., the visual context determined in block 208) to perform one or more additional or alternative operations.

For instance, the context determination system 102 can capture portions of various graphical user interfaces and generate digital representations of digital content within the graphical user interfaces in substantially the same manner as described above. In this example, the context determination system 102 can compare the various digital representations from the various graphical user interfaces to determine a similarity among the graphical user interfaces. As an example, the context determination system 102 compares a number or types of digital representations included in a first graphical user interface and a number or types of digital representations included in a second graphical user interface and determines that the first and second graphical user interfaces are similar in response to determining that the first and second graphical user interfaces include the same or substantially the same number or types of digital representations. In some examples, the context determination system 102 can determine a similarity between captured portions of graphical user interfaces using various methods or techniques such as, for example, by using fuzzy hashing, image fingerprinting, or any other suitable method or technique.

In another example, the context determination system 102 can capture a portion of a graphical user interface in substantially the same manner as described above and analyzes text (e.g., the digital content elements 302, 304, 306, 308 of FIG. 3) to derive (e.g., determine) a sentiment of the text using any suitable sentiment analysis technique or method. In still another example, the context determination system 102 analyzes the text and determines a number of words in the captured portion of the graphical user interface, detect grammar or spelling errors, detect slang within the text, or perform any other analysis on the text.

System Implementation Example

Figure 5:
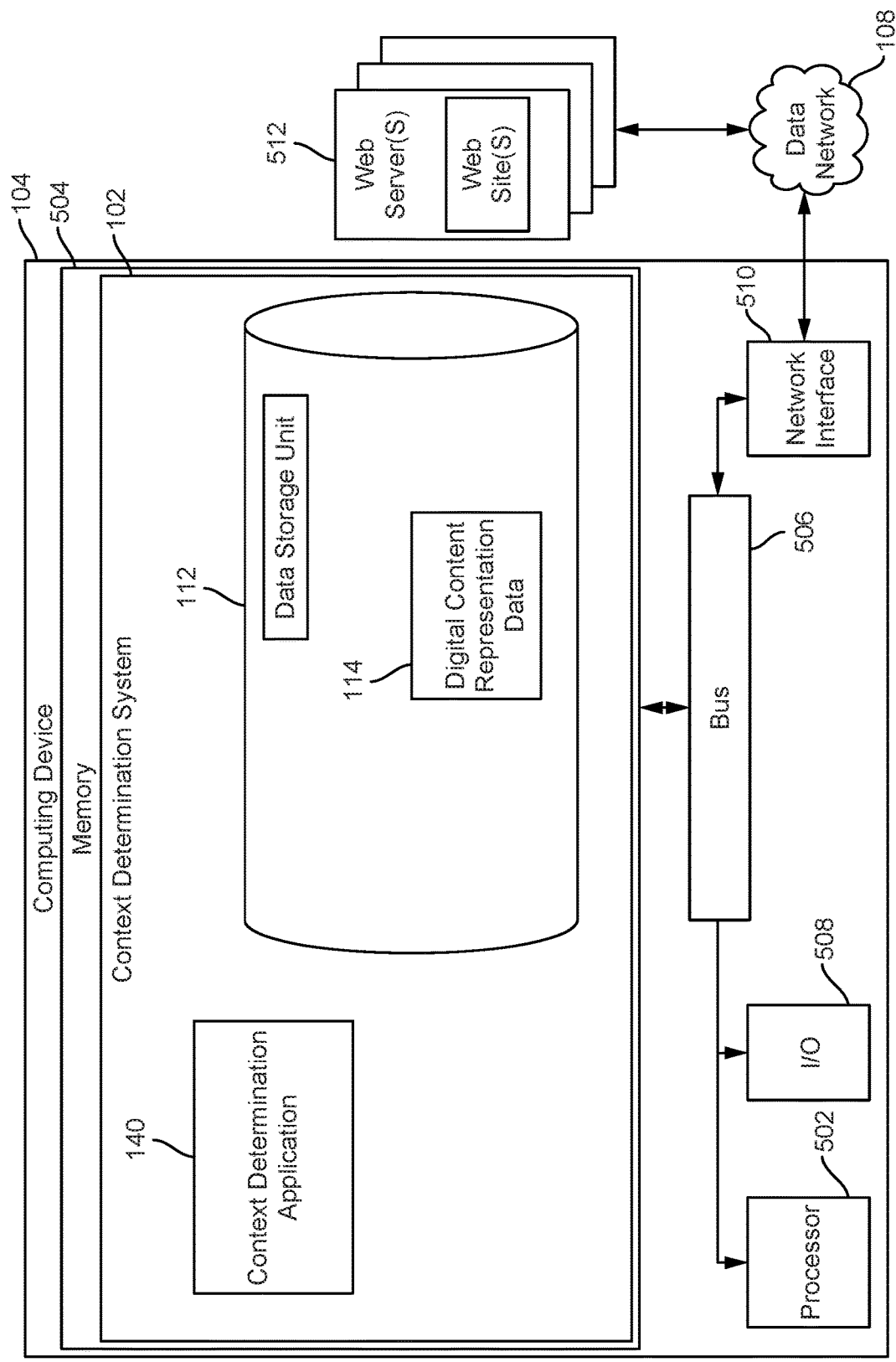
FIG. 5 is an example of a block diagram of a computing device that executes a visual context determination system to determine visual context associated with user behavior and correlating the visual context with the user behavior based on digital content on the user device in accordance with one or more embodiments.

Any suitable computing system or group of computing systems can be used for performing the operations described herein. FIG. 5 is an example of a block diagram of a computing device that executes a context determination system 102 to perform the operations described herein.

The depicted example of the computing device 104 includes one or more processors 502 communicatively coupled to one or more memory devices 504. The processor 502 executes computer-executable program code stored in the memory device 504, accesses information stored in the memory device 504, or both. Examples of the processor 502 include a microprocessor, an application-specific integrated circuit ("ASIC"), a field-programmable gate array ("FPGA"), or any other suitable processing device. The processor 502 can include any number of processing devices, including one or more processors 502 that are configured by program code to implement the operations described above, such as the operations depicted in FIG. 2 that are described with respect to processing devices.

The memory device 504 includes any suitable non-transitory computer-readable medium for storing the context determination system 102. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. One or more memory devices 504 are used to implement the operations described above, such as the operations depicted in FIGS. 1-2 that are described with respect to one or more non-transitory computer-readable media.

The computing device 104 may also include a number of external or internal devices such as input or output devices. For example, the computing device 104 is shown with an input/output ("I/O") interface 508 that can receive input from input devices or provide output to output devices. A bus 506 can also be included in the computing device 104. The bus 506 can communicatively couple one or more components of the computing device 104. In some embodiments, the bus 506 is used to implement the operations described above with respect to FIGS. 1-2 that involve communicating signals via a data bus.

The computing device 104 executes program code that configures the processor 502 to perform one or more of the operations described above with respect to FIGS. 1-2. The program code includes, for example, context determination application 140 or other suitable applications that perform one or more operations described herein. The program code may be resident in the memory device 504 or any suitable computer-readable medium and may be executed by the processor 502 or any other suitable processor. In some embodiments, the program code described above is stored in the memory device 504, as depicted in FIG. 5. In additional or alternative embodiments, the program code described above is stored in one or more memory devices accessible via a data network.

The computing device 104 accesses the digital content representation data 114 in any suitable manner. In some embodiments, the digital content representation data 114 is stored in one or more memory devices accessible via a data network 108. In additional or alternative embodiments, some or all of the digital content representation data 114 is stored in the memory device 504.

The computing device 104 depicted in FIG. 5 also includes at least one network interface 510. The network interface 510 includes any device or group of devices suitable for establishing a wired or wireless data connection to one or more data networks 108. Non-limiting examples of the network interface 510 include an Ethernet network adapter, a modem, and/or the like. The computing device 104 is able to communicate with one or more servers via the network interface 510. In some embodiments, the network interface 510 is used to implement the operations described above with respect to FIGS. 1-2 that involve communicating signals via a data network.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method for determining visual context associated with user behavior and correlating the visual context with the user behavior, the method comprising operations performed by at least one processor, the operations comprising:
    capturing, via a context determination application included in a user device and at a time of a user action on a user interface of the user device, a portion of the user interface provided to a user, the portion of the user interface including digital content displayed via the user interface;
    detecting the digital content included in the portion of the user interface;
    generating, via a digital representation generation engine, a digital representation of the digital content included in the captured portion, the digital representation indicating the digital content and wherein the digital representation excludes the digital content;
    determining a visual context associated with the user action based on the generated digital representation, the visual context describing the digital content displayed via the user interface at the time of the user action; and
    determining, based on the visual context, subsequent digital content to output to the user of the user device to create a subsequent visual context to encourage a particular user behavior.

2. The method of claim 1, wherein detecting the digital content comprises:
    analyzing, by the processor, the captured portion of the user interface; and
    determining, by the processor, a position or type of the digital content within the captured portion of the user interface and wherein the digital representation of the digital content indicates the position or type of the digital content.

3. The method of claim 1, wherein determining the visual context comprises:
    determining, by the processor, an amount of digital content displayed via the portion of the user interface at the time of the user action by analyzing the captured portion of the user interface.

4. The method of claim 1, wherein determining the visual context comprises:

determining, by the processor, a percentage of the captured portion of the user interface that includes the digital content at the time of the user action by analyzing the captured portion of the user interface.

5. The method of claim 1, wherein determining the visual context comprises:
   determining, by the processor, a first size of a first digital content displayed via the captured portion of the user interface at the time of the user action;
   determining, by the processor, a second size of a second digital content displayed via the captured portion of the user interface at the time of the user action; and
   comparing, by the processor, the first size of the first digital content and the second size of the second digital content to a size of the captured portion of the user interface to determine a ratio between the first digital content and the second digital content.

6. The method of claim 1, wherein determining the visual context comprises:
   determining, by the processor, a first size of a first digital content displayed via the captured portion of the user interface at the time of the user action;
   determining, by the processor, a second size of a second digital content displayed via the captured portion of the user interface at the time of the user action;
   determining, by the processor, a size of the captured portion of the user interface;
   comparing, by the processor, the first size of the first digital content and the second size of the second digital content to the size of the captured portion of the user interface to determine a first relative size of the first digital content and a second relative size of the second digital content; and
   comparing, by the processor, the first and second relative sizes to determine which of the first and second digital content is larger.

7. The method of claim 1, wherein determining the visual context comprises:
   detecting, by the processor, an amount of empty space in the captured portion of the user interface;
   determining, by the processor, a size of the digital content; and
   comparing, by the processor, the size of the digital content and the amount of empty space in the captured portion of the user interface to determine a ratio between the amount of empty space in the captured portion of the user interface and size of the digital content.

8. The method of claim 1, wherein determining the visual context comprises:
   detecting, by the processor, a first color in the captured portion of the user interface;
   detecting, by the processor, a second color in the captured portion of the user interface;
   determining, by the processor, a first amount of the first color and a second amount of the second color in the captured portion of the user interface; and
   comparing, by the processor, the first and second amount to determine whether the first or second color occurs more frequently in the captured portion of the user interface.

9. The method of claim 1, wherein determining the visual context comprises:
   detecting, by the processor, a first color and a second color in the captured portion of the user interface;
   determining, by the processor and using a Red, Green, Blue (RGB) color rounding model, a similarity between the first color or the second color and a color group of a plurality of color groups, the plurality of color group comprising a red color group, a green color group, or a blue color group;
   grouping, by the processor, the first color or second color into a color group based on the determined similarity; and
   determining, by the processor, which color group of the plurality of color groups that appears more frequently in the captured portion of the user interface.

10. The method of claim 1, wherein determining the visual context comprises:
    determining, by the processor and based on a pixel of the captured portion of the user interface, an average color of the captured portion of the user interface by recursively scaling down an image of the captured portion of the user interface to obtain the pixel.

11. The method of claim 1, wherein determining the visual context comprises:
    detecting, by the processor, a plurality of colors in the captured portion of the user interface; and
    generating, by the processor, a color histogram of the plurality of colors, the color histogram representing a distribution of the plurality of colors.

12. A system comprising:
    a processing device; and
    a non-transitory computer-readable medium communicatively coupled to the processing device, wherein the processing device is configured to perform operations comprising:
        capturing, via a context determination application, a portion of a user interface provided to a user at a time of a user action on the user interface, the portion of the user interface including digital content displayed via the user interface;
        detecting the digital content included in the portion of the user interface;
        generating, via a digital representation generation engine, a digital representation of the digital content included in the captured portion, the digital representation indicating the digital content and wherein the digital representation excludes the digital content;
        determining a visual context associated with the user action based on the generated digital representation, the visual context describing the digital content displayed via the user interface at the time of the user action; and
        determining, based on the visual context, subsequent digital content to output to the user to create a subsequent visual context to encourage a particular user behavior.

13. The system of claim 12, wherein the processing device is further configured to detect the digital content by:
    analyzing the captured portion of the user interface; and
    determining a position or type of the digital content within the captured portion of the user interface and wherein the digital representation of the digital content indicates the position or type of the digital content.

14. The system of claim 12, wherein the processing device is further configured to determine the visual context by:
    Determining an amount of digital content displayed via the portion of the user interface at the time of the user action by analyzing the captured portion of the user interface.

15. The system of claim 12, wherein the processing device is further configured to determine the visual context by:

determining a percentage of the captured portion of the user interface that includes the digital content at the time of the user action by analyzing the captured portion of the user interface.

16. The system of claim 12, wherein the processing device is further configured to determine the visual context by:
   determining a first size of a first digital content displayed via the captured portion of the user interface at the time of the user action;
   determining a second size of a second digital content displayed via the captured portion of the user interface at the time of the user action; and
   comparing the first size of the first digital content and the second size of the second digital content to a size of the captured portion of the user interface to determine a ratio between the first digital content and the second digital content.

17. The system of claim 12, wherein the processing device is further configured to determine the visual context by:
   determining a first size of a first digital content displayed via the captured portion of the user interface at the time of the user action;
   determining a second size of a second digital content displayed via the captured portion of the user interface at the time of the user action;
   determining a size of the captured portion of the user interface;
   comparing the first size of the first digital content and the second size of the second digital content to the size of the captured portion of the user interface to determine a first relative size of the first digital content and a second relative size of the second digital content; and
   comparing the first and second relative sizes to determine which of the first and second digital content is larger.

18. The system of claim 12, wherein the processing device is further configured to determine the visual context by:
   detecting an amount of empty space in the captured portion of the user interface;
   determining a size of the digital content; and
   comparing the size of the digital content and the amount of empty space in the captured portion of the user interface to determine a ratio between the amount of empty space in the captured portion of the user interface and size of the digital content.

19. The system of claim 12, wherein the processing device is further configured to determine the visual context by:
   detecting a first color in the captured portion of the user interface;
   detecting a second color in the captured portion of the user interface;
   determining a first amount of the first color and a second amount of the second color in the captured portion of the user interface; and
   comparing the first and second amount to determine whether the first or second color occurs more frequently in the captured portion of the user interface.

20. The system of claim 12, wherein the processing device is further configured to determine the visual context by:
   detecting a first color and a second color in the captured portion of the user interface;
   determining a similarity between the first color or the second color and a color group of a plurality of color groups using a Red, Green, Blue (RGB) color rounding model, the plurality of color group comprising a red color group, a green color group, or a blue color group;
   grouping the first color or second color into a color group based on the determined similarity; and
   determining which color group of the plurality of color groups appears more frequently in the captured portion of the user interface.

\* \* \* \* \*